United States Patent
Bates et al.

(10) Patent No.: US 6,832,350 B1
(45) Date of Patent: Dec. 14, 2004

(54) ORGANIZING AND CATEGORIZING HYPERTEXT DOCUMENT BOOKMARKS BY MUTUAL AFFINITY BASED ON PREDETERMINED AFFINITY CRITERIA

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 09/163,643

(22) Filed: Sep. 30, 1998

(51) Int. Cl.$^7$ .......................... G06F 15/00; G06F 17/21; G06F 17/30; G06F 17/00
(52) U.S. Cl. ................ 715/501.1; 715/512; 715/513; 707/1; 707/2; 707/3; 707/4; 707/5; 707/6; 707/7
(58) Field of Search .................. 707/501, 513, 707/104, 1–7; 345/352, 354, 335; 709/245; 715/501.1, 512–13

(56) References Cited

U.S. PATENT DOCUMENTS

| | | | | |
|---|---|---|---|---|
| 5,801,702 A | * | 9/1998 | Dolan et al. | 345/357 |
| 5,917,491 A | * | 6/1999 | Bauersfeld | 345/352 |
| 5,924,105 A | * | 7/1999 | Punch, III et al. | 707/513 |
| 5,978,828 A | * | 11/1999 | Greer et al. | 709/224 |
| 6,032,162 A | * | 2/2000 | Burke | 707/501 |
| 6,088,707 A | * | 7/2000 | Bates et al. | 707/501 |
| 6,208,995 B1 | * | 3/2001 | Himmel et al. | 707/104 |
| 6,493,702 B1 | * | 12/2002 | Adar et al. | 707/3 |

OTHER PUBLICATIONS

Abrams, David et al., Information archiving with bookmarks: personal Web space construction and organization, ACM Conference on Human Factors in Computing Systems, Apr. 18–23, 1998, pp. 41–48.*

Ivanovich, Michael, Mapping your Website terrain with bookmarks—Part 1, HPAC Engineering, Oct. 1997, vol. 69, Issue 10, pp. 85.*

Yoelle S. Maarek, et al., Automatically Organizing Bookmarks per Contents, Fifth International World Wide Web Conference, <URL: http://www5conf.inria.fr/fich_html/papers/P37/Overview.html>, pp. 1–13, May 1996.*

Kosmynin, A., From Bookmark managers to distributed indexing: an evolutionary way to the next generation of search engines, IEEE Communications Magazine, vol. 35, Issue 6, pp. 146–151, Jun. 1997.*

* cited by examiner

*Primary Examiner*—Joseph Feild
*Assistant Examiner*—William L. Bashore
(74) *Attorney, Agent, or Firm*—Wood, Herron & Evans, LLP

(57) ABSTRACT

An apparatus, program product, and method utilize a "bookmark affinity" to facilitate organizing by mutual affinity stored storage location addresses, or "bookmarks," each for a given hypertext document. This affinity is found by comparing specific criteria of the addressed hypertext document, such as relatedness of address path, keywords in the document description, word count of non-trivial words, and shared out-bound storage location addresses, or "links." These affinities allow presenting related bookmarks to aid in finding the desired hypertext document.

25 Claims, 11 Drawing Sheets

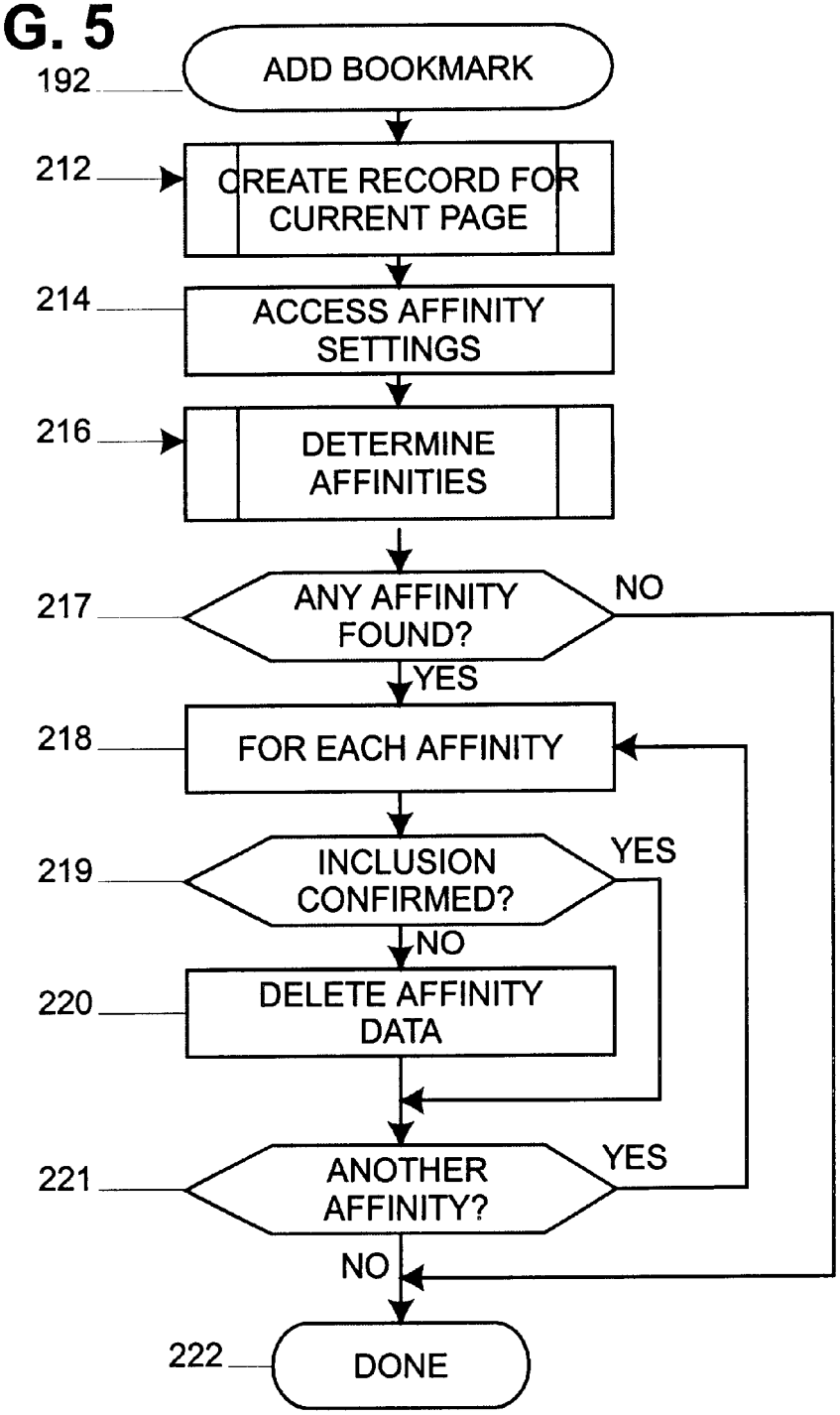

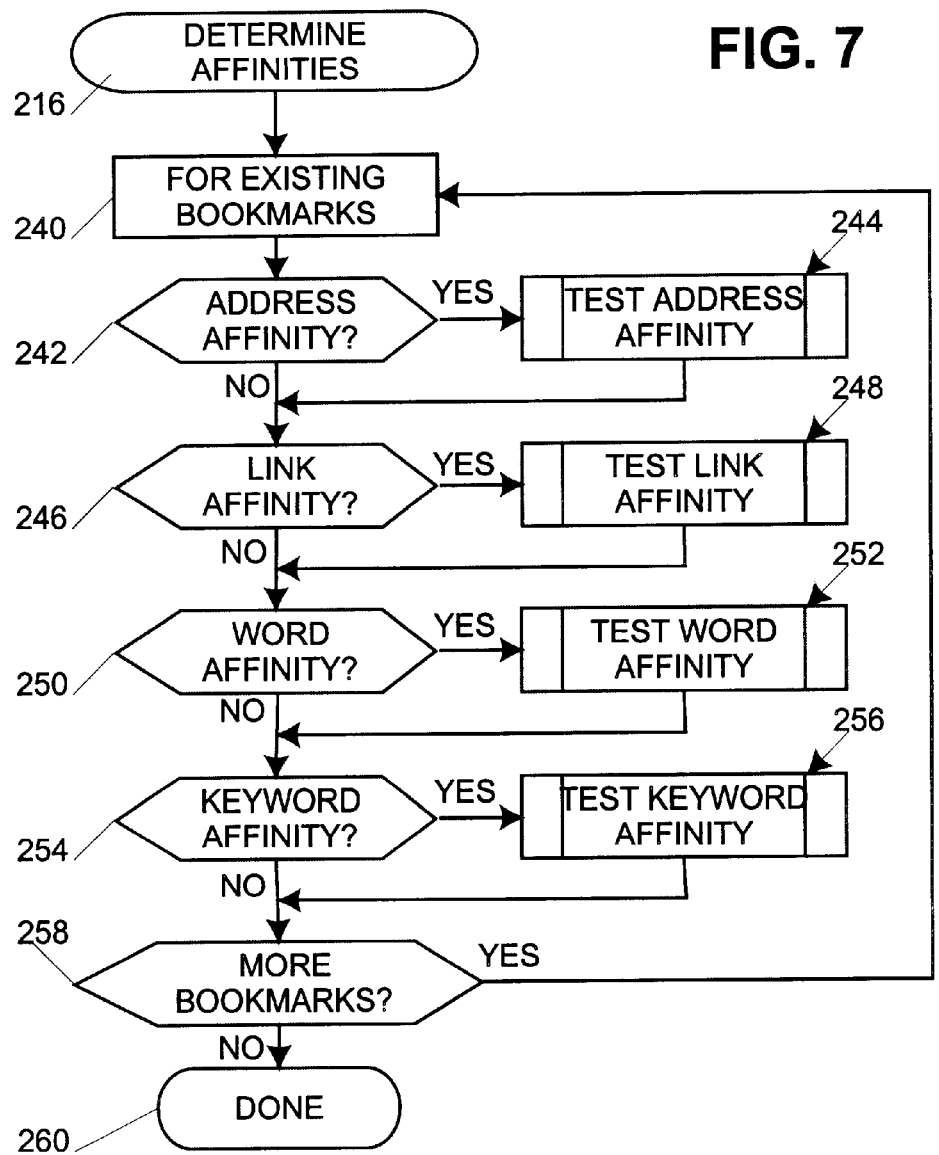

ORGANIZING AND CATEGORIZING HYPERTEXT DOCUMENT BOOKMARKS BY MUTUAL AFFINITY BASED ON PREDETERMINED AFFINITY CRITERIA

FIELD OF THE INVENTION

The invention is generally related to computers and computer software. More specifically, the invention is generally related to the display of and navigation between hypertext documents with browser computer programs and the like.

BACKGROUND OF THE INVENTION

The amount and variety of information that can be accessed through a computer continues to increase at an astounding rate. The Internet, in particular, has enabled computer users to access a wide variety of information from other computers located all over the world.

Much of the information accessible via the Internet is organized into hypertext documents, which are typically documents formatted in a language known as Hypertext Markup Language (HTML), and which are accessed via a segment of the Internet known as the World Wide Web. Hypertext documents typically include one or more embedded "hypertext links" that an end user can select to either jump to different documents, or to jump to different locations within the same document. Each hypertext document typically is identified by the storage location (known as a Uniform Resource Locator (URL)) at which the document is stored, with a hypertext link to a particular document specifying the storage location of that document so that, upon selection of the link, that document may be retrieved.

A wide variety of other information such as text, graphics, video, sound, and animation may be integrated into hypertext documents, and moreover, these documents can be organized into "sites", typically maintained by a single entity, that collect multiple related documents together in a coherent fashion. Furthermore, due to the immense popularity of the World Wide Web, many private computer networks now also support hypertext documents, as do a number of existing computer operating systems and computer software applications.

A computer program, often referred to as a browser, is typically used to navigate between and through hypertext documents. With a browser, an end user can use a mouse or other pointing device to point and click on links such as highlighted text, images or other user interface components (e.g., buttons) in documents to navigate to different documents and/or to different locations within the same document.

While the point and click interface used to navigate between hypertext documents is exceptionally simple to learn and use, the wealth of available information makes it relatively easy for a user to forget the specific locations of useful documents.

As an attempt to address this difficulty, many browsers support the use of aliases (also referred to as "shortcuts", "bookmarks" or "favorites"), through which a user can maintain a list of favorite sites or documents that a user expects to revisit in the future. Retrieving a bookmarked document at a later date then only requires the user to locate the bookmark corresponding to a desired document in the list, and then select that bookmark to initiate retrieval of the document.

An important limitation of bookmark lists, however, is that the larger the lists become, the more difficult it is to locate specific bookmarks in the lists. Thus, a user often must exercise some degree of self-control to only add bookmarks for the more important documents so as to keep the size of the list at a manageable level.

As a partial answer to the problem of overly long bookmark lists, many browsers support the use of folders in a bookmark list. Each folder is a manually-created category that can have bookmarks and/or other folders attached to it. Folders allow the creation of hierarchical bookmark list structures wherein a higher tier folder is accessed in order to display its attached lower tier bookmarks and folders.

The user is solely responsible for the creation of efficient folder structures. The user creates a folder name, places the folder in the appropriate place in the bookmark list, and moves or copies to this new folder the desired lower tier bookmarks and folders. The folder is not associated directly with a hypertext document and thus the browser cannot assist by accessing properties of the hypertext document to suggest appropriate folder names. Also, the browser does not analyze existing bookmarks and folders for patterns of association that would suggest placement options and appropriate lower tier contents of the new folder.

The use of folders for organizing bookmarks is problematic. First, the user may not utilize the capability of organizing with folders due to unfamiliarity or due to the administrative burden. Second, the user may create an inferior bookmark list structure due to poor characterization of his bookmarks. Third, the user may not correctly discern the associations within his bookmark list and poorly place folders and bookmarks. Fourth, since the bookmarks are not automatically cross referenced across folders, the user may fail to put the bookmark in multiple locations within the bookmark list structure, thus helpful hypertext documents are not suggested when accessing certain folders. Fifth, if the user does place copies in multiple locations, the user is burdened with additional work during creation and editing of the bookmark list, as well as creating additional physical storage requirements. Sixth, the user may not realize that folders and bookmarks have become "stale", having become inaccessible or having original or changed content that no longer has interest to this user. Sixth, the browser may be used by a second user that did not create the folder structure, and thus does not appreciate its organization.

One situation where a user might refrain from organizing and maintaining a bookmark list using the folder method is when the user finds related sites of interest over a period of time, and has created intervening bookmarks that are not related. During this span of time, the user may not remember having saved a useful bookmark or may have not recognized how some of these sites were related and lent themselves to being grouped. Also, some bookmarks may have been of interest for only a specific period of time but were left on the list due to the inconvenience in editing the list. In addition, the bookmark list may have begun by being cluttered by bookmarks and folders created by the provider of the computer or software or other users.

Therefore, a significant need exists for an improved manner of creating bookmarks, and organizing and presenting such bookmarks in a more logical and coherent fashion.

SUMMARY OF THE INVENTION

The invention addresses these and other problems associated with the prior art by providing an apparatus, program product, and method that organize bookmarks for hypertext documents by determining a mutual affinity by one or a plurality of shared characteristics. These affinities allow the bookmark list to be dynamically organized to serve as a basis for restructuring an existing bookmark list and/or to facilitate keeping bookmarks current.

The new capabilities of organizing and maintaining the bookmark list are based on determining bookmark affinities in a number of manners consistent with the invention. The bookmark record itself, or the hypertext document accessible by the bookmark, may provide these characteristics.

Examples of characteristics from which affinities can be made include first the storage location address, often a Universal Resource Locator (URL), that will show that the two hypertext documents share a related path. Second, the hypertext document referenced, often formatted in Hypertext Markup Language (HTML), may contain additional storage locations addresses or URL's that are the same as in a second hypertext document. Third, the content of each hypertext document can be scanned for non-trivial words and a count made of the shared words. Fourth, hypertext documents may have descriptions that are accessed, e.g., via an embedded tag such as an HTML meta tag that is often used by Internet search engines in performing searches. In typical usage, information within a meta tag is not displayed by an Internet browser, although displayed information may also be a basis for determining affinity. These shared keywords can be a basis for an affinity.

When these characteristics or others are compared individually or in combination, a determination of an affinity can be made. This determined affinity then allows new bookmarks to be associated with existing bookmarks and grouped in a bookmark list. Moreover, an existing set of bookmarks can be assessed for affinities to reorganize or otherwise update a bookmark list.

Therefore, consistent with one aspect of the invention, a computer-implemented method is provided for associating a first bookmark for a storage location to a second bookmark. The method includes determining an affinity between first and second bookmarks; and associating the first bookmark with the second bookmark.

The invention also provides in another aspect an apparatus, program product and method in which selected bookmarks from a bookmark list may have a secondary function as containers for other bookmarks in the list. Specifically, given bookmarks in a list may additionally operate both as navigable links and as folders for lists of related bookmarks. Then, depending upon the particular user input supplied to display representations of such bookmarks, either the link or folder functions of such bookmarks may be activated to either access hypertext documents or view lists of related bookmarks.

Bookmarks may be related to a given bookmark based upon affinity in the manner discussed above. Moreover, such bookmarks may be related simply by a user manually organizing bookmarks to be contained within other bookmarks, in much the same manner as bookmarks are conventionally organized within folders.

Therefore, consistent with another aspect of the invention, a computer-implemented method is provided for accessing hypertext documents. The method includes displaying a display representation of a first of a plurality of bookmarks, each bookmark having associated therewith a storage location address for use in accessing a hypertext document, the first bookmark further having associated therewith a list of related bookmarks from the plurality of bookmarks; in response to first user input directed to the display representation of the first bookmark, accessing the hypertext document located at the storage location address associated with the first bookmark; and in response to second user input directed to the display representation of the first bookmark, displaying a display representation of each bookmark in the list of related bookmarks associated with the first bookmark.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a flowchart illustrating the program flow of the add bookmark routine of FIG. 4.

FIG. 7 is a flowchart illustrating the program flow of the determine affinities routine of FIG. 5.

DETAILED DESCRIPTION

Hardware and Software Environment

Figure 1:
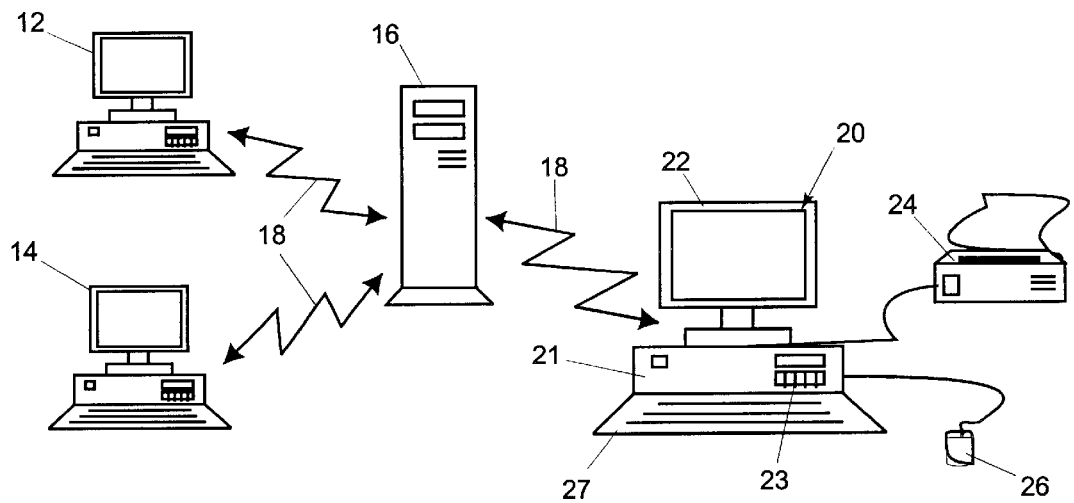
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
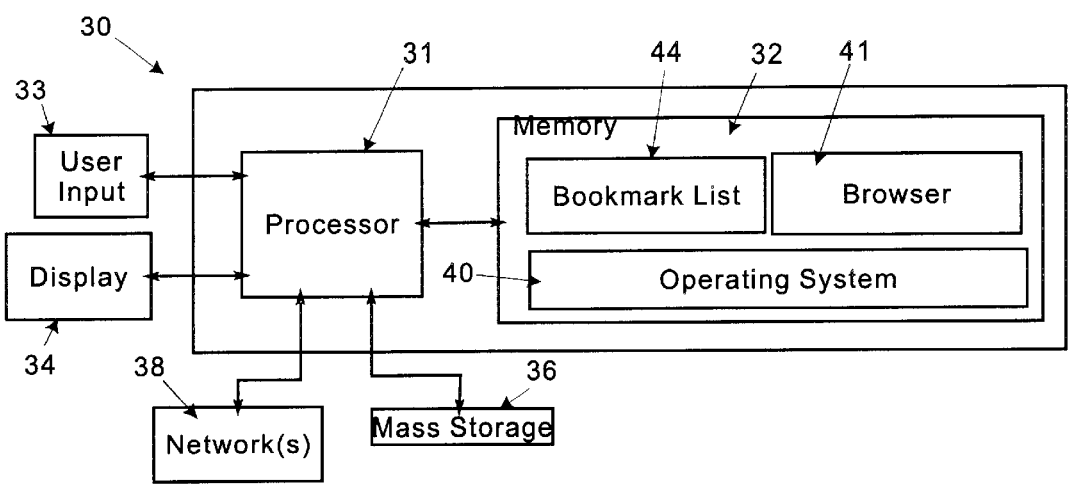
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., browser 41 that accesses a bookmark list 44, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Bookmark Affinity Lists

The illustrated embodiments of the invention generally utilize a bookmark record to associate related bookmarks, using these associations to aid the user to return to favorite hypertext documents.

For example, for use with the Internet or an intranet, hypertext documents may be in a Hypertext Markup Language (HTML) format, with the storage location identifier for each hypertext document being identified by the Uniform Resource Locator (URL) of the document. It should be appreciated that in other applications, other document formats and/or storage location identifiers may be used in the alternative.

A hypertext link is typically defined in a hypertext document using a hypertext link definition found in the source hypertext document, e.g., using suitable HTML-compatible tags. The link is presented to a user via a display representation generated by a HTML-compatible rendering engine in a browser or other computer program. A display representation is considered to include practically any audio and/or visual representation of information to a user, e.g., any combination of text, text formatting and/or attributes, graphics, sound, animation, video, etc.

A rendering engine, the display portion of the browser, is also typically used to generate an overall display representation of the hypertext document within which the hypertext link definition is found. It should be appreciated that the generation and display of HTML-based display representations, as well as display representations in other formats, are well known in the art.

Data Structure

A bookmark (also referred to as an alias, a favorite, a shortcut, etc.) is typically used in connection with browsing to identify specific hypertext documents that a user may wish to revisit from time to time. Bookmarks are typically maintained in a common data structure, and are typically presented to a user via a pull-down menu and/or a separate window. A user is then able to navigate to a bookmarked document merely by selecting the bookmark from the menu or window. A set of bookmarks is often collected into a hypertext document and becomes a bookmark list.

In the illustrated embodiments, hypertext documents are associated with a given bookmark stored in a bookmark record including title; storage location address such as a URL, list of outbound hypertext links such as URL's that are contained within the hypertext document; list of non-trivial words contained within the hypertext document and perhaps their respective frequencies; and keywords contained within a description of the hypertext document such as the meta tag for an HTML document.

Once the hypertext documents are characterized by this information in the bookmark record, the affinity links between the bookmarks can be stored. Although bookmark affinities may be handled and stored separate from bookmarks or the like, the discussion hereinafter will focus on the use of bookmark affinities integrated into the bookmark management system of a browser computer program.

The discussion refers to designating a bookmark which can mean alerting the program that this bookmark may be referred to for specific processing. This can mean moving the cursor to bookmark with the arrow keys so that it is highlighted, left clicking once to designate the bookmark, using a pointing device such as mouse cursor over the bookmark, etc. Once a bookmark is designated, the discussion below refers to selecting the bookmark, whereby the browser knows to access the hypertext document at the storage location contained in the bookmark record. This can occur by double clicking, depressing the return key with the bookmark highlighted, right clicking and selecting the appropriate option on a pop-up menu associated by left clicking, and other methods.

Figure 3:
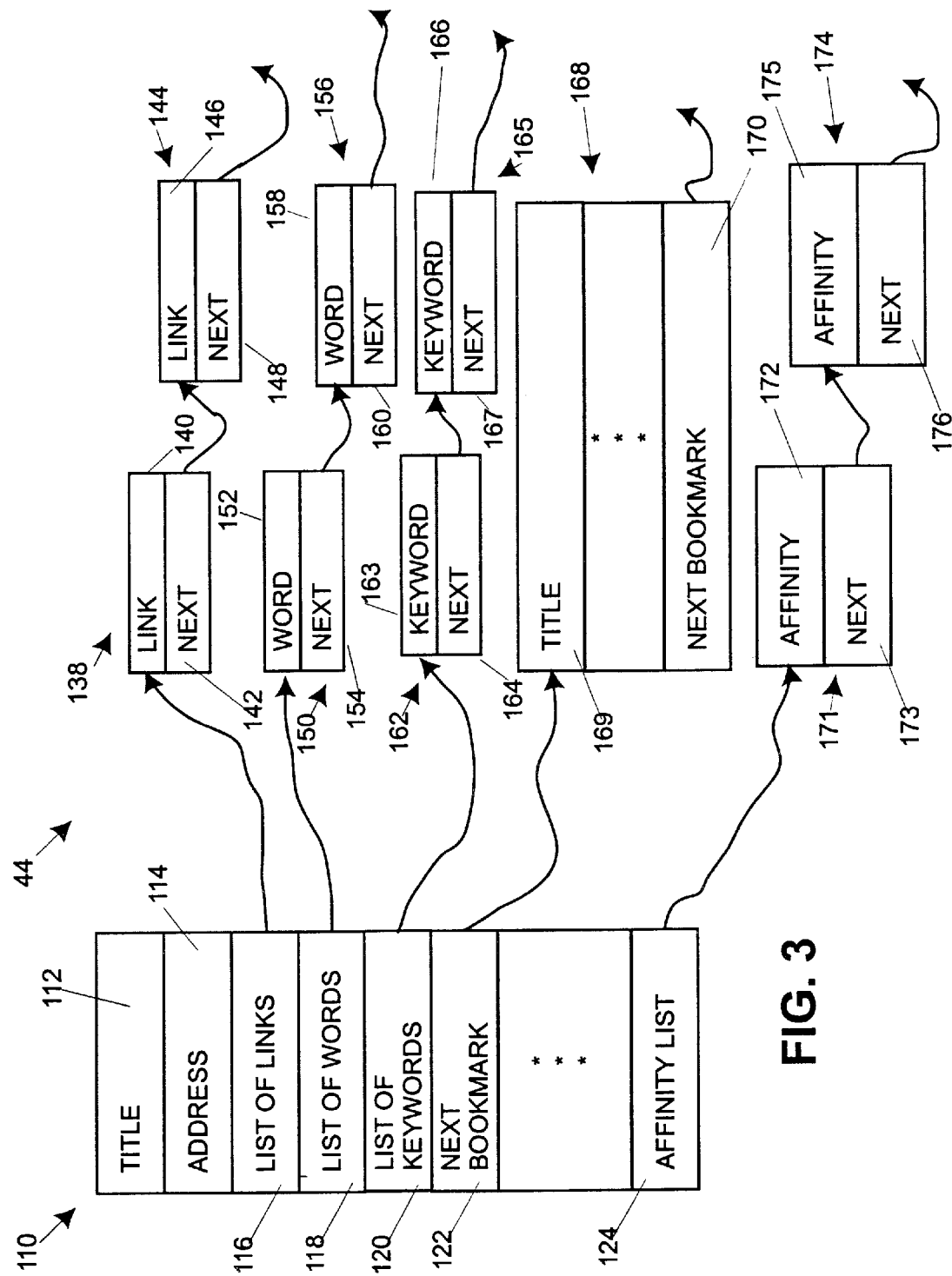
FIG. 3 is a block diagram of the data structure of the bookmark list used by the browser of FIG. 2.

One suitable bookmark data structure consistent with the invention is illustrated at FIG. 3. Bookmark list data structure 44 is implemented as a linked list of bookmark records 110, with each bookmark record including a title field 112, a storage location address field 114, a list of links pointer 116, a list of words pointer 118, a list of keywords pointer 120, a next bookmark pointer 122, and an affinity list pointer 124.

The title field 112 of each bookmark record 110 provides a descriptive title of the bookmark obtained from either the source hypertext document or supplied by the user.

The address field 114 contains the storage location address for the associated hypertext document, typically a URL.

In the illustrative embodiment, the bookmark record 110 forms the bookmark list 44 by having a pointer in the next bookmark field 122 pointing to additional bookmark records 168. It should be appreciated that the last bookmark record in the bookmark list data structure 44 will typically have a NULL pointer stored in field 170. A bookmark list can also be achieved by having all bookmark records contained within a discernable storage area, such as a hypertext document. Thus, all bookmark records in the storage area are deemed to be part of the bookmark list without having the records be linked.

In the illustrated example consistent with the invention, additional characteristics are taken directly from the hypertext document. These characteristics are readily obtained with the hypertext document already accessed by the browser 41 at the time the user chooses to add a bookmark for the hypertext document. Thus, no access delays are necessary since all of the characteristics can be determined from data in dynamic random access memory, virtual memory, or other local storage means.

The first of these characteristics regards outbound links within the hypertext document. These links are storage location addresses that may be in the form of a URL discernible within a HTML document. The list of links pointer 116 points to the first link record 138 that has a first link field 140 containing the link and a next link pointer 142. The next link pointer 142 links to the second link record 144 that has a second link field 146 containing the link and a next link pointer 148 linking to any next link record. Typically, the list of links pointer 116, or the next link pointer, would contain a NULL value if no additional outbound links are stored.

Similarly, the list of words pointer 118 is used to link to a first word record 150 that includes a first word field 152 and a next word pointer 154. The next word pointer 154 links to a second word record 156 including a second word field 158 and a next word pointer 160 linked to any additional word records. Typically, the list of words pointer 118, or the next word pointer, would contain a NULL value if no additional words are stored.

Similarly, the list of keywords pointer 120 is used to link to a first keyword record 162 that includes a first keyword field 163 and a next keyword pointer 164. The next keyword pointer 164 links to a second keyword record 165 including a second keyword field 166 and a next keyword pointer 167 linked to any additional keyword records. Typically, the list of keywords pointer 120, or the next keyword pointer, would contain a NULL value if no additional keywords are stored.

The affinity list pointer 124 is shown as being a pointer to the next affinity pointer record 171 that includes an affinity pointer field 172 and a next affinity record pointer 173. The next affinity record pointer 173 links to a second affinity pointer record 174 that includes a second affinity pointer field 175 and a next affinity record pointer 176, that links to any additional affinity pointer records. Typically, the affinity list pointer 124, or the next affinity record pointer, would contain a NULL value if no additional affinity records are stored. The illustrative embodiment utilizes an affinity pointer list to reference existing bookmark records, determined to have an affinity. Alternatively, each affinity pointer record 171 could be a full record containing all information contained in existing bookmarks but independent so that eliminating a bookmark does not necessarily eliminate its corresponding as an affinity.

It should also be appreciated that additional information may be stored in each bookmark record, e.g., a description field, etc., as is well known in the art. Furthermore, bookmark records may also be organized into a folder, directory or other tree-like data structure in the alternative. In general, the use and configuration of a bookmark data structure is known in the art, and any known modifications to a bookmark data structure may be utilized in the alternative.

Browser Configuration and Operation

Figure 4:
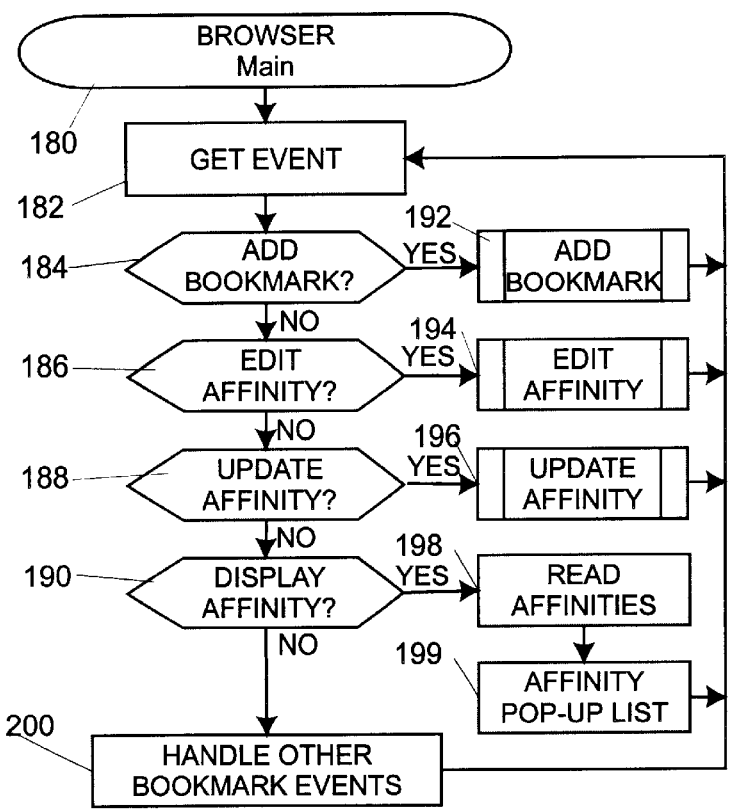
FIG. 4 is a flowchart illustrating the program flow of a main routine for the browser of FIG. 2.

Now turning to FIG. 4, a main routine for browser 41 is illustrated at 180. Routine 180 represents an event-driven main routine for the browser 41. In an event-driven system, the browser waits for various events to be passed to the browser. In response to an event, the browser executes predetermined program code to handle the event. Once the event has been handled, the browser returns to a state of waiting for additional events.

It should be appreciated that routine 180 is but one suitable implementation of a browser consistent with the invention. Other implementations may use, for example, a procedural model, or in the alternative, an object-oriented model may be used, whereby individual display components and controls are represented as separate objects configured to receive different events directed to such objects. In general, the implementation of a browser or other computer program consistent with the invention may utilize any known programming model, and it will be appreciated that such an implementation would be well within the capabilities of one of ordinary skill in the art having benefit of the disclosure presented herein.

As illustrated in FIG. 4, routine 180 begins at block 182 by waiting for new events. Then, in blocks 184–190, various events are detected by the browser and control is diverted to appropriate routines to handle these events. Several events relevant to the creation, maintenance and display of bookmark affinities consistent with the invention are detected in blocks 184–190. It should be appreciated that a wide variety of additional events may also be handled by a browser (e.g., as represented by block 200); however, such other events are not relevant to an understanding of the invention, and need not be discussed in further detail herein.

One event that may be handled by routine 180 is that of an event to add a bookmark, which is detected at block 184 and handled by an add bookmark routine 192. Another event is to edit an affinity, which is detected at block 186 and handled by an edit affinity routine 194. Another event is that of updating affinity detected at block 188 and handled by an update affinity routine 196. Moreover, a display affinity event is detected at block 190 and handled by the series of steps of blocks 198 to access the affinities associated with a bookmark, and 199 where the affinity is presented in a pop-up list.

The add bookmark routine 192 is illustrated in greater detail in FIG. 5. Routine 192 calls a create record for current page routine 212 to access and store the characteristic information about the hypertext document in the bookmark record. This routine 212 will be discussed in more detail below. Once the characteristics are stored in the bookmark record, routine 192 proceeds to access affinity settings depicted in block 214. This may be default settings for the browser 41 or may be obtained from the user. These settings include the type of bookmark characteristics upon which affinity will be determined. The settings could also include a threshold for when an affinity is determined, a minimum or maximum number of affinities which are appropriate to be assigned to any bookmark and whether or not the user would like to interact with the creation of affinities. Once the settings are known, processing of the new bookmark goes to block 216 which determines the affinities based upon the settings. The determination of affinities routine 216 is also described in greater detail below.

If no affinities are returned by block 216, then in block 217 processing goes to block 222 to end routine 192, returning to routine 180. If at least one affinity was found, then processing goes from block 217 to block 218.

Routine 192 incorporates a verification of whether the affinities found should be associated with the bookmark. In some implementations, verification may not be required or be obtained from default settings, such as maximum number of affinities allowable. If the implementation interacts with the user for verification, candidate affinities may be individually or as a set presented. In addition to only accepting or declining the inclusion of an affinity, the user could be given options to modify a candidate or candidates, such as tailoring the title 112.

An example of verifying the inclusion of each candidate at a time is illustrated beginning in block 217 where a Do-While loop for each affinity found is executed until block 221. Block 217 first tests whether any affinity was found in block 216. If it is not, no further processing is necessary by routine 192 and it goes to block 222 and returns back to the main browser routine 180. If at least one affinity is found in block 217, then a Do-While verification loop for each affinity as shown in block 218, ending at block 221, is performed. The inclusion of the affinity is confirmed in block 219. The affinity was stored as part of one of the test affinity routines, 244, 248, 252, or 256. Consequently, a decision not to include the affinity in block 219 results in the affinity being deleted in block 220. In affinity list as shown in FIG. 3, this deletion can be accomplished for example by changing the value in the next affinity pointer 173 to skip the deleted affinity or to place NULL as the value if the last.

It should be obvious to one skilled in the art that the list of affinities could be stored in its entirety within the storage space allocated for the bookmark record 110 rather than being a linked list. In addition, each affinity field 172 could be a pointer to another bookmark record, thus reducing storage requirements and steps needed to update bookmark records. Alternatively, the affinity field 172 could be self-contained bookmark data independent of the existing bookmark record from which it was originally generated.

After the affinity data is stored in block 220, it is tested in block 221 whether there is another affinity that must be verified. If so, it goes back to the top of the verification loop in block 218 and checks for inclusion for the next affinity in block 219. If, however, in block 221 there are no remaining affinities to verify, then routine 192 is done, and block 222 therefore returns back to the main browser routine 180.

It should be appreciated that routine 192 is one suitable implementation of a way to find affinities for a new bookmark against an existing bookmark. For example, verification could be omitted. Also, a plurality of bookmarks could be assessed against each other at one time rather than assessing against those previously assessed. Moreover, the new bookmark could be assessed for affinity against non-bookmark items, such as defined folders that have characteristics.

Figure 6:
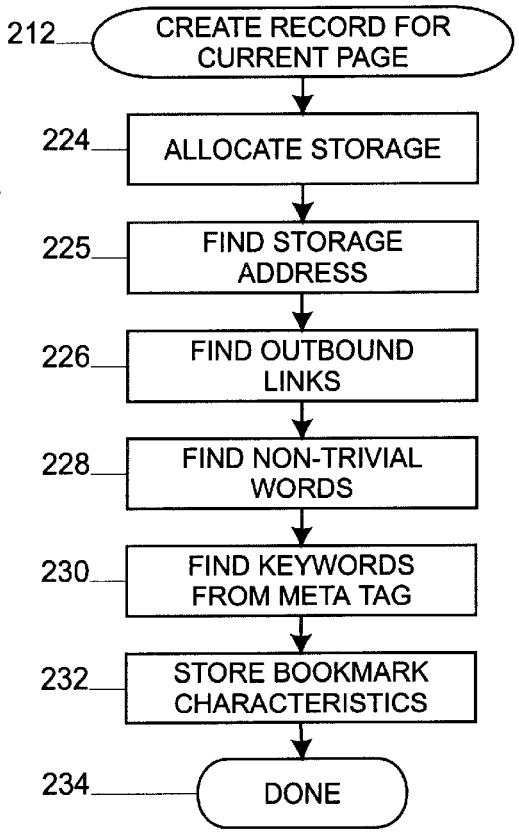
FIG. 6 is a flowchart illustrating the program flow of the create record for current page routine of FIG. 5.

Referring to FIG. 6, the create record for current page routine 212 that was mentioned as part of the add bookmark routine 192 is provided. Routine 212 begins by allocating storage in block 224 for the new bookmark record 110. Routine 212 then finds a storage location address in block 225 for the hypertext document to have a bookmark made.

Then, the hypertext document is scanned for outbound links in block 226 and it is further scanned for non-trivial words in block 228. Its meta tag is scanned for keywords in block 230. Then, in block 232, routine 212 stores the bookmark characteristics found in the previous steps. Once this is complete, routine 212 is done and it returns at block 234.

It should be appreciated that routine 212 shown in FIG. 6 is shown for the illustrative example only when all of these four characteristics are tested for affinity. Some of the actual characteristics chosen to be tested would determine what scanning of the hypertext document was performed by routine 212.

Referring to FIG. 7, the determine affinities routine 216 that was called by routine 192 is described. Routine 216 will test for a plurality of existing bookmarks in block 240; however, it could be implemented to only test one new and one existing bookmark. This feature is of use as described below when an existing plurality of bookmarks, such as an existing bookmark list, is updated to have affinities. The new bookmark is tested in turn against each existing bookmark by the Do-While loop beginning at block 240 and ending at block 258. Within the Do-While loop, blocks 242, 246, 250 and 254 test whether the settings require testing for address affinity, link affinity, word affinity or keyword affinity, respectively. If any of these settings are positive, then the respective test affinity routine is called in one of blocks 244, 248, 252 and 256. If no more bookmarks remain to be tested as shown in block 258, the routine is done and processing returns in block 260. Otherwise, processing returns to block 240.

It should be appreciated that the routine 216 could also be accomplished in parallel processing of all of the tests. A subset of these tests could be performed or completely different characteristics could be evaluated. Moreover, the individual criteria and testing procedure for each of these characteristics could be incorporated in this routine, but it is broken out to simplify the illustration.

Figure 8:
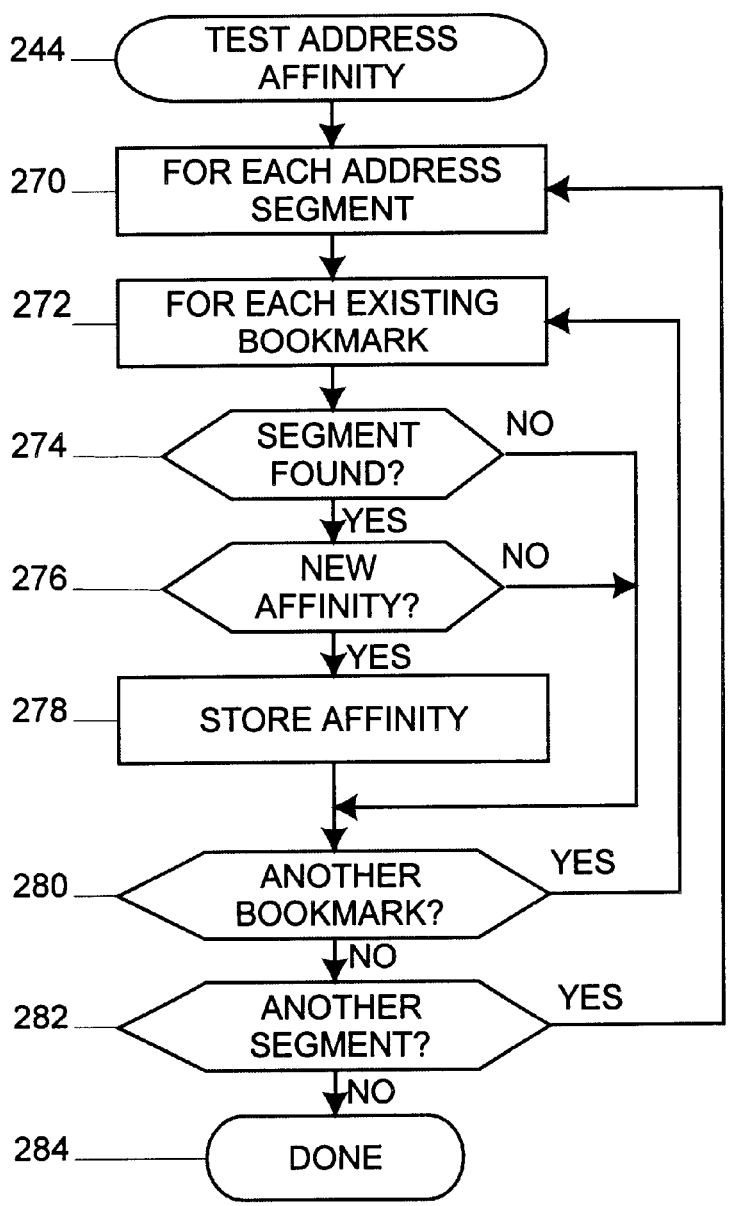
FIG. 8 is a flowchart illustrating the program flow of the test address affinity routine of FIG. 7.

Test address affinity routine 244 is illustrated in FIG. 8. Routine 244 begins in block 270 by parsing the storage location address, which is perhaps a URL, into sub-strings to be compared with the existing bookmark. For example, the parsing could be limited to sub-strings with at least two domain levels. Thus, for the URL http//www.weather.minneapolis.mn.com, a suitable parsed address segment would be minneapolis.mn or weather.minneapolis, but not weather.minn or minn.mn. Once the first parsed segment is selected in block 270, processing proceeds to block 272 which is generalized for a case where the new bookmark to be assessed for affinity is compared against a plurality of bookmarks, although this generalization is not required for routine 216, which provides only one new bookmark and one existing bookmark at a time to its sub-routines. Thus, in block 274, the one bookmark address segment is compared to the full address of another bookmark. If no overlap is found, then no further testing is compared against those two bookmarks respectively, processing proceeding to block 280. If, however, an overlap is found in block 274, then it is screened in block 276 to see whether or not the overlap is significant enough to warrant being an affinity. Just as the new bookmark address was parsed in block 270, this block 276 looks at the overlap to make sure a significant overlap has been found. For example, it may be in the settings for the affinity determination that no overlap should be found if the overlap is six levels down in the domain structure. For example, in the previous mentioned segment of weather.minneapolis was compared to http//www.weather.minneapolis.rock station.alaska.fred.com. If the overlap is deemed to be an affinity in block 276, then it is stored in block 278.

Storing an affinity could be achieved in a number of ways. In the illustrative embodiment, The bookmark record 110 has an affinity list pointer 124 that points to a first affinity record 171. The first affinity record 171 includes an affinity field for identifying the affinity and a next affinity pointer 173 that points to a second affinity record 174, that in turn also has an affinity field 175 and a next affinity pointer 176. Typically, the last affinity record would have a NULL value in its next affinity pointer field.

A test is made in block 280 if there is another existing bookmark against which this address segment should be tested. If there is, it loops back to block 272 and proceeds through the segment comparison. If that address segment has been tested against all existing bookmarks, then block 282 determines whether or not the new bookmark address segment has other parses that should be tested. If there are, processing returns to block 270. Otherwise, routine 244 is done and returns at block 284.

Figure 9:
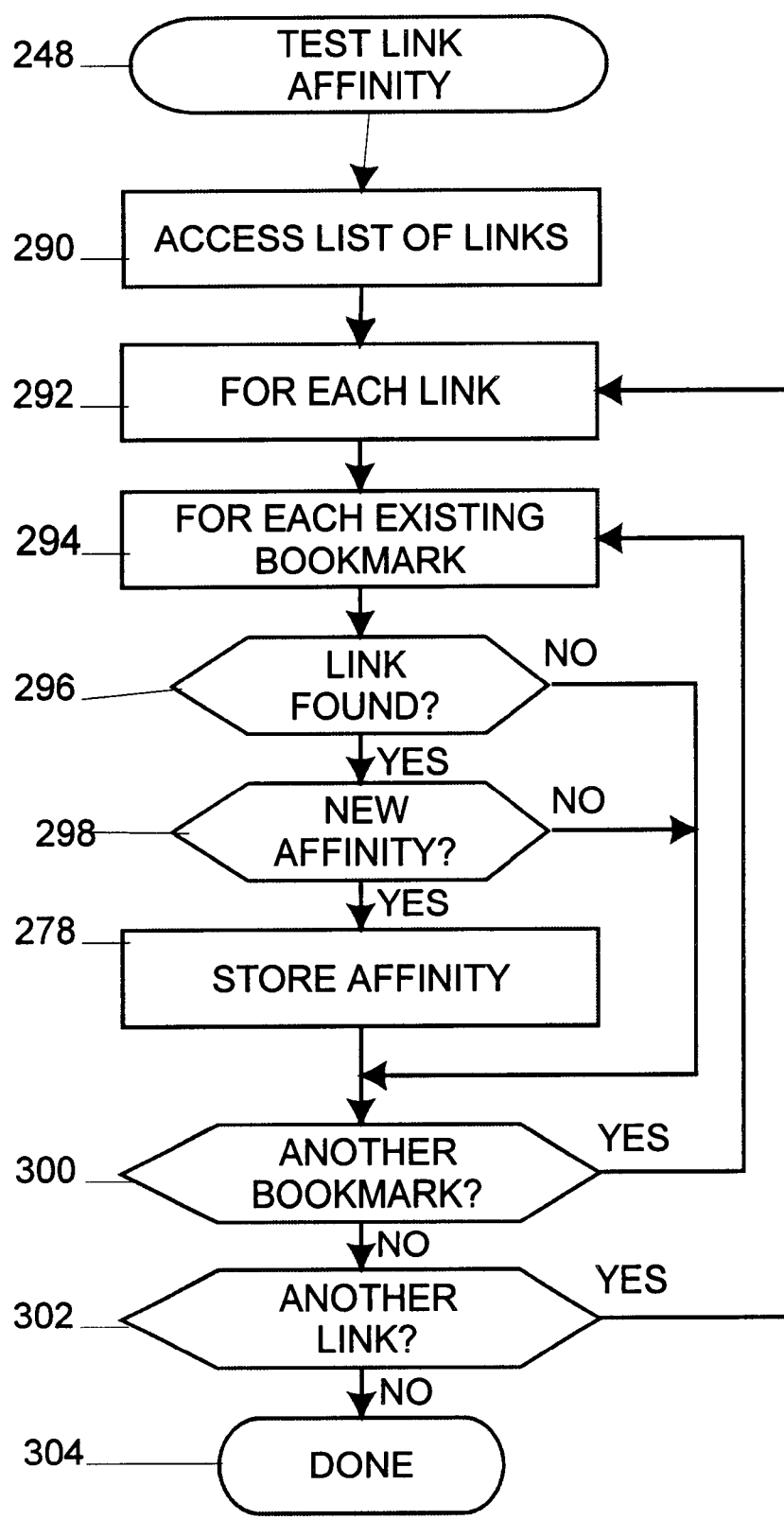
FIG. 9 is a flowchart illustrating the program flow of the test link affinity routine of FIG. 7.

Referring to FIG. 9, the test link affinity routine 248, referenced in the determine affinities routine 216 of FIG. 7, finds links based on shared outbound links in the hypertext document. At block 290, the list of links in the first bookmark is accessed. Then, for each link starting in block 292, a Do-While loop is executed until block 302 to test for shared outbound links. Nested within this loop is another Do-While loop beginning at block 294 and returning at block 300 where the current link found in the first bookmark location is tested against a second bookmark until all the existing bookmarks have been tested. In block 296, a determination is made of whether the same the link exists in the second bookmark. If not, the inner Do-While loop is over and processing goes to block 300. If the link was found in the second bookmark, a threshold determination of whether or not to state an affinity in block 298 is made. This could be due to a number of criteria, such as a running total of number of overlapping links required in order to state an affinity, for example. If the threshold criteria is satisfied at block 298, then in block 278 the affinity is stored. Once all the comparisons are made between the links found in the first bookmark and all the other bookmarks, then routine 248 is complete and returns at block 304.

Figure 10:
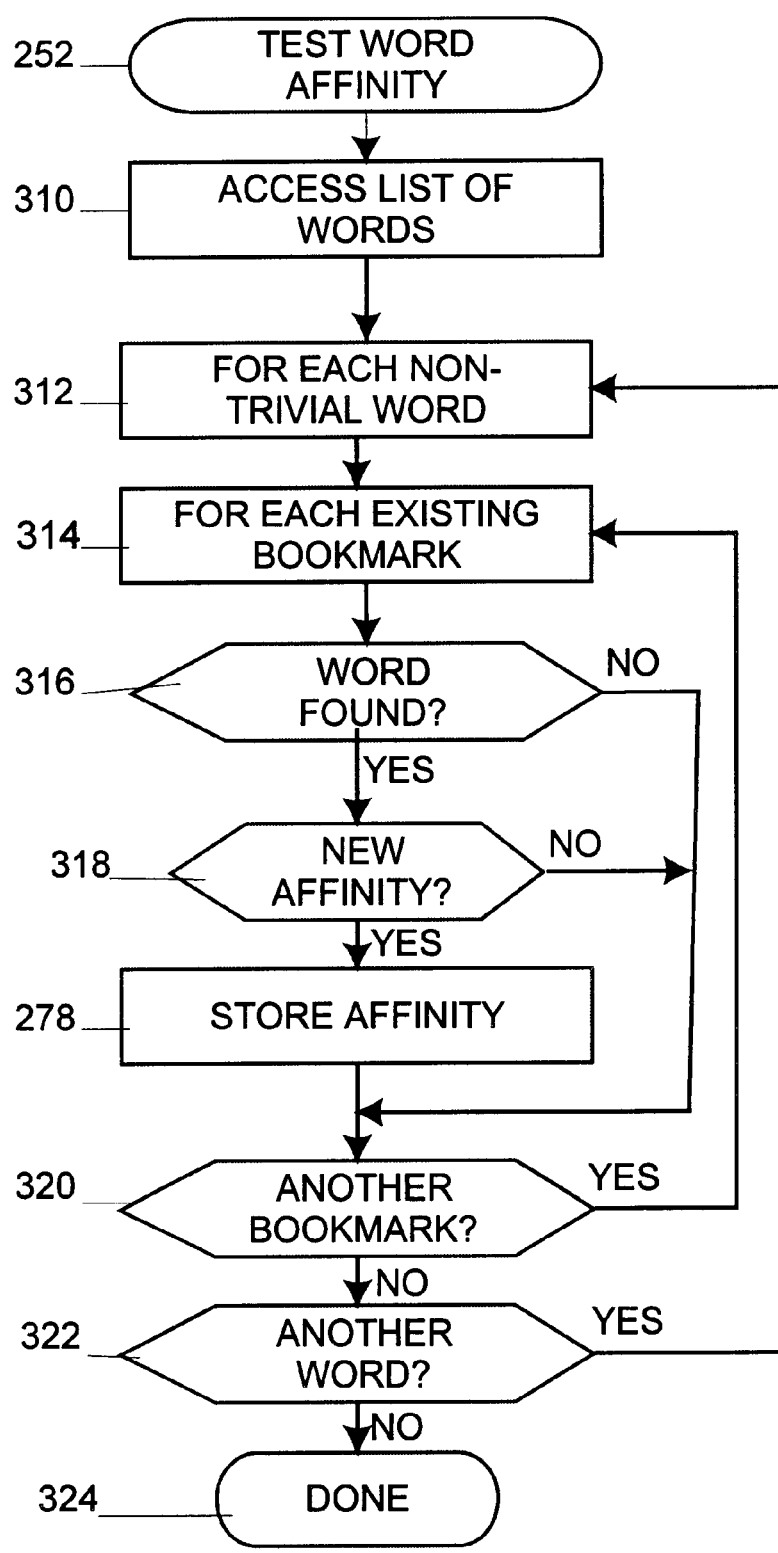
FIG. 10 is a flowchart illustrating the program flow of the test word affinity routine of FIG. 7.

Referring to FIG. 10, the test word affinity routine 252 referenced in FIG. 7 looks for the amount of shared non-trivial words in the content of the referenced hypertext documents. This routine scans the hypertext documents for non-trivial words; however, this step may have been accomplished in advance, as shown in FIG. 6. In block 310, the first hypertext document referenced from the storage location address in the first bookmark is scanned for non-trivial words that can be compared to the second hypertext document. Beginning in block 312 are two nested Do-While loops for testing each of the found non-trivial words from the first hypertext document to each of the second hypertext documents in turn. The first Do-While loop begins at block 312 and completes at block 322. The nested Do-While loop that selects each second hypertext document referenced by a second bookmark goes from block 314 to block 320. Within these two Do-While loops, first at block 316 the non-trivial word, also referred to as a word count, is tested for being in the second hypertext document. If it is not, then the inner Do-While loop is complete and processing goes to 320 and hence, back to block 314 to test for the next second hypertext document in the list. If the keyword is found in both the first and second hypertext documents, then a determination in block 318 is made as to whether a new affinity has been determined. Again, the criteria could be a minimum number of non-trivial words shared. In any event, once a new affinity has been found in block 318, then in block 278, the affinity is stored. Once all of the second hypertext documents and all the non-trivial words found in the first hypertext document have been evaluated one against the other, then routine 252 is complete and returns at block 324.

Figure 11:
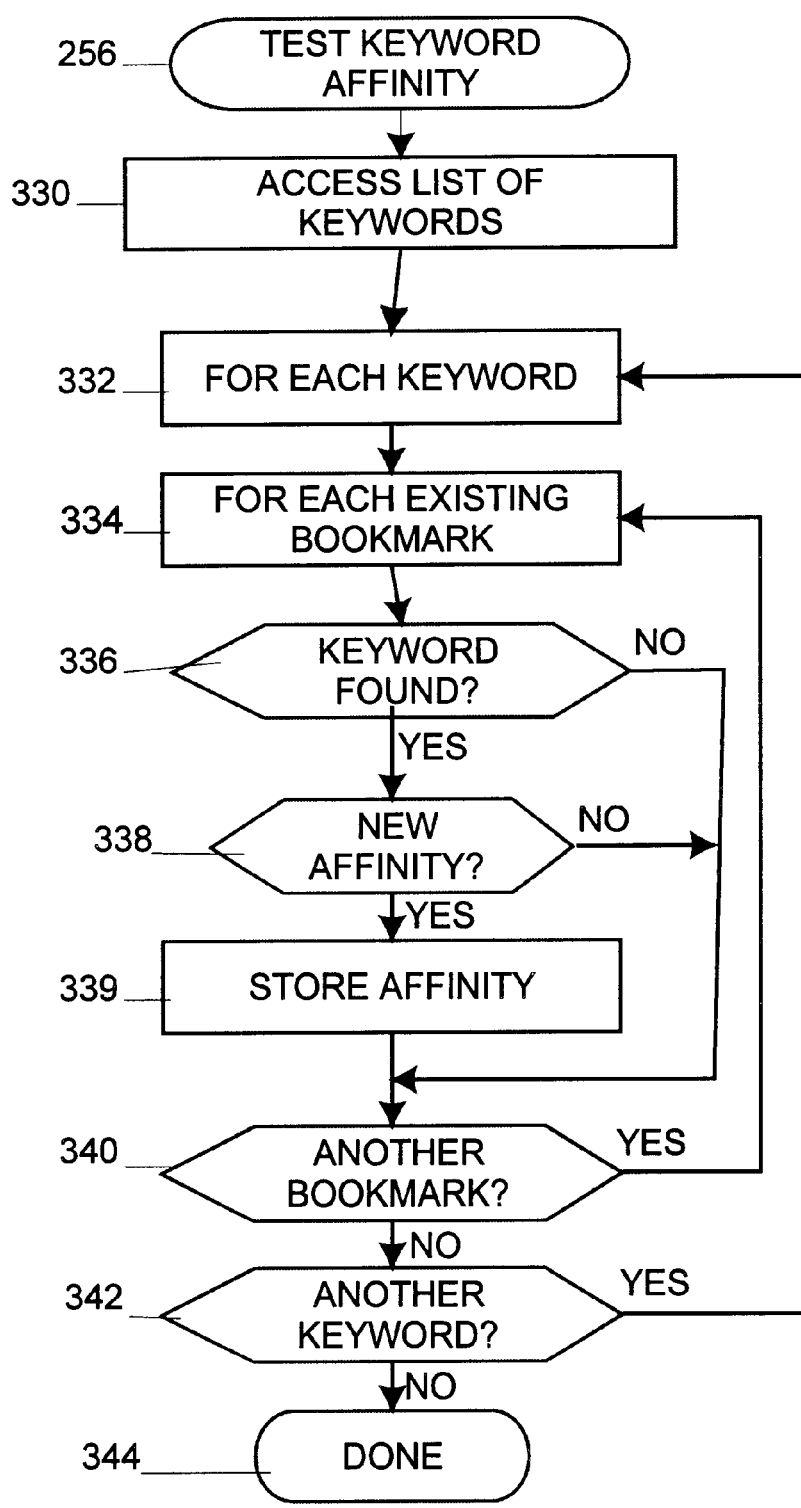
FIG. 11 is a flowchart illustrating the program flow of the test keyword affinity routine of FIG. 7.

Referring to FIG. 11, the test keyword affinity routine begins in block 256. This routine was referenced in FIG. 7. This routine concentrates on a description of the hypertext document for comparing, and thus does not have to scan the entire contents of the hypertext document. HTML documents often have a hidden text, referred to as a "meta tag" that many Internet search engines utilize in finding appropriate hypertext document in accordance to a search query. Routine 256 begins processing at block 330 where this description, often termed a "meta tag", is scanned by referencing the storage location address contained in the first bookmark, and within this meta tag, keywords are found that will be search against the second hypertext document found at the second bookmark. In the illustrated embodiment, this scan is performed in routine 212 shown in FIG. 6 and locally stored to speed subsequent processing. As in the other affinity tests, the illustrated embodiment has two Do-While loops. The outer Do-While loop, beginning at block 332 and ending at block 342, tests each keyword found in the first hypertext document in turn against one of the other meta tags for a second hypertext document found at a second bookmark. The inner Do-While loop goes from 334 to block 340. Inside of these two Do-While loops at block 336, the keyword is tested for being found in the second hypertext document. If it is not found, then the inner Do-While loop is done and processing goes to block 340. If it is found, then the threshold criteria is tested in block 338 to determine whether the keyword is found in sufficient quantities or in combination with other keywords in order to find an affinity. If it is, then an affinity is stored at block 339. Otherwise, processing goes to block 340. If there are other bookmarks remaining in block 340, it goes back to the top of the inner Do-While loop of block 334. If there is no second bookmark remaining, processing goes to block 342 to see if there is another keyword found in the first hypertext document. If there is, processing goes to the top of the outer Do-While loop at block 332. If not, then routine 256 is complete and returns at block 344.

Figure 12:
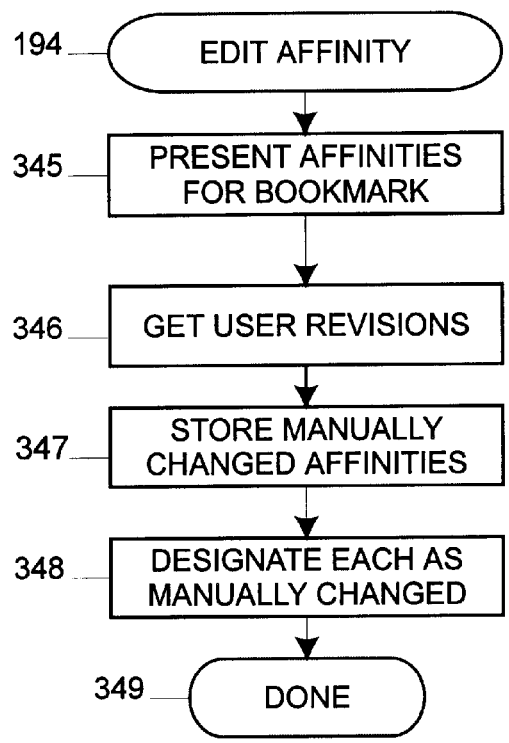
FIG. 12 is a flowchart illustrating the program flow of the edit affinity routine of FIG. 4.

Referring to FIG. 12, the edit affinity routine beginning in block 194, first referenced in FIG. 4 of the browser main routine 180, provides an opportunity for a user to manually edit an affinity. In the illustrative embodiment, it further includes displaying the affinities found to the user in block 345 for his or her review, e.g., in a dialog box. This could also include an opportunity if no affinities have been automatically found for the user to manually insert all of the information for an affinity. In block 346, the inputs are brought in and in block 347 stored in the bookmark record data structure 110. After which, in block 348, an additional capability is shown of designating such a manually edited affinity so that later updating of the affinities can treat these in a different manner. After block 348, the edit affinity routine 194 is complete and returns at block 349.

Figure 13:
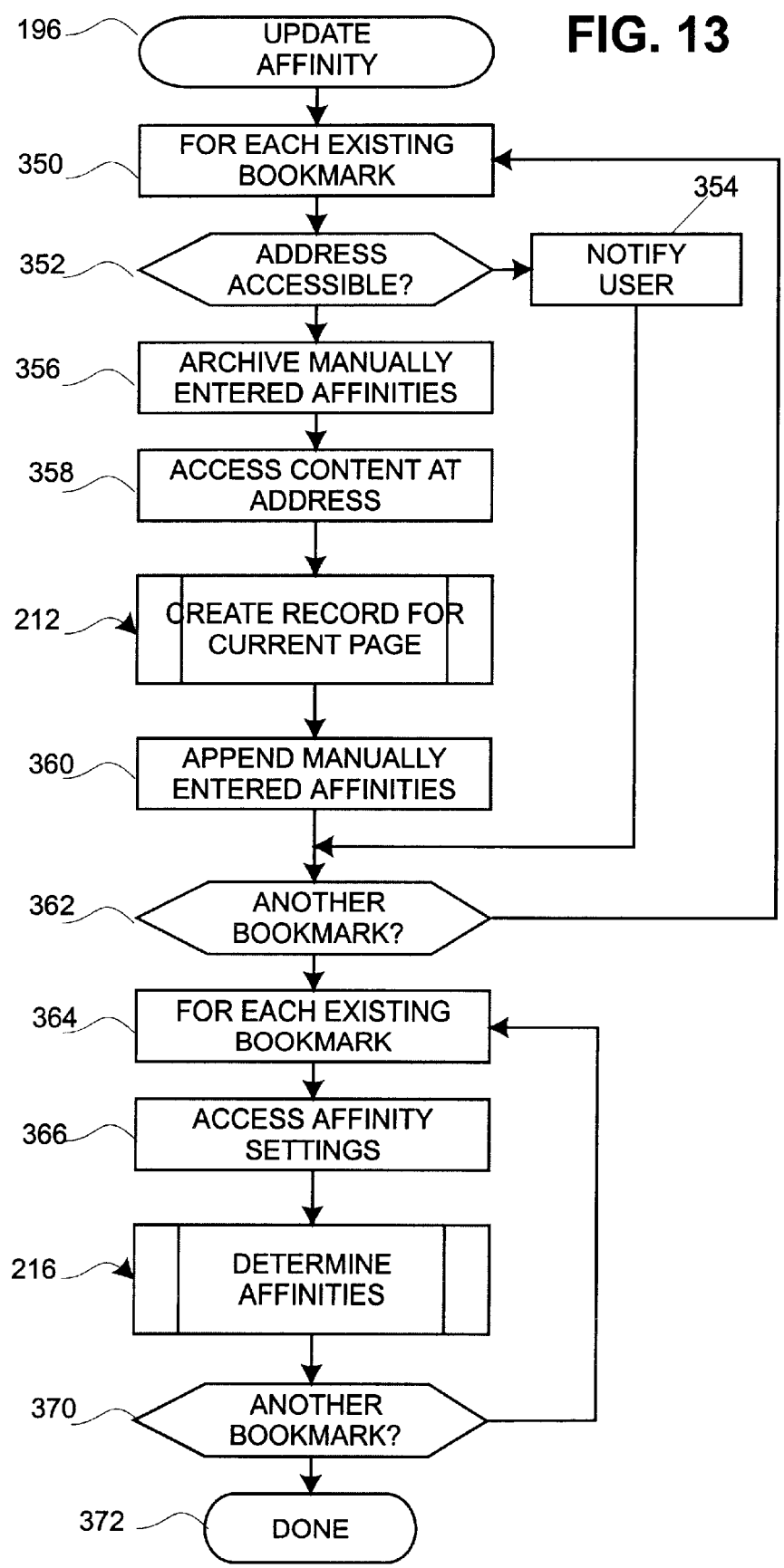
FIG. 13 is a flowchart illustrating the program flow of the update affinity routine of FIG. 4.

Referring to FIG. 13, the update affinity routine 196, referenced in FIG. 4, provides an automated way for the browser 41 to periodically or at user command update existing bookmark records. This could be for instances where an existing bookmark list that has not been previously processed for affinities could be assessed for affinities en mass. It could also be to scan for hypertext documents associated with these bookmarks that have changed in such a way as to make the previously determined affinities obsolete. Routine 196 begins with a Do-While loop from block 350 until block 362 to update bookmark characteristics.

For each existing bookmark record, it is determined in block 352 whether the address contained in the bookmark is accessible. This could be accomplished by utilizing the browser to access the hypertext document. The routine could access a copy of the hypertext document in cache memory from the last retrieval. The hypertext document may be in dynamic random access memory such as when currently rendered for display. For bookmarks to hypertext documents accessed as local or network storage, the routine could utilize file finders and management tools. The routine could also find that accessing all hypertext documents is disabled due to browser settings or system performance considerations.

If in block 352 the hypertext document is not accessible, then this first Do-While loop is ended by notifying the user in block 354 that updating of this bookmark is not possible and processing goes to block 362 and then back to the top of the Do-While loop to test the next bookmark. If the address is accessible, then it is possible to re-characterize this bookmark to make sure that all the characteristics are still current by going first to block 356 where manually entered affinities are archived. Then, at block 358, the hypertext document is accessed at the address contained in this bookmark so that it can be treated just like a new hypertext document for which a new bookmark with affinities is to be made. This process is begun by going to block 212 which refers to the previously discussed sub-routine for creating a record for current page of FIG. 6. This routine updates all the information for the current hypertext document accessible at that address. Then, in block 360, those manually entered affinities are returned to the updated bookmark record. If other bookmarks remain to be initialized in block 362, then processing returns back to block 350. Otherwise, processing goes to block 364 for another Do-While loop that for each existing bookmark now initialized, would go to block 366 to access the current affinity settings that will be used to find an affinity. Then, in block 216, the sub-routine for determining affinities is called, previously discussed in FIG. 7. Once these new affinities are found, routine 216 returns to routine 196. Then, at the end of the Do-While loop in block 370, a test is made whether any bookmarks exist to be tested against the others. If there are, then processing returns to block 364 to test for the next bookmark. Otherwise, routine 196 is done and returns at block 372 to the main browser routine 180 shown in FIG. 4.

Figure 14:
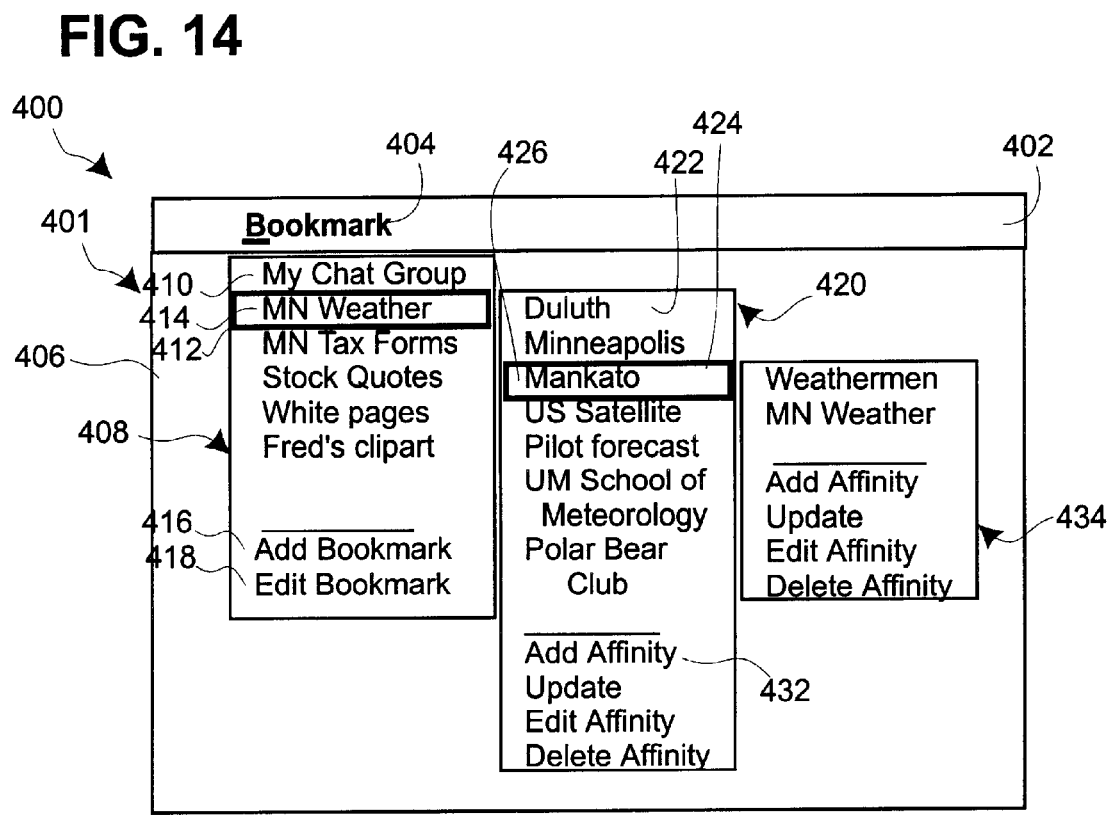
FIG. 14 is a block diagram of a computer display, illustrating a display representation of an exemplary affinity list by the browser of FIG. 2.

Through the use of affinity lists in the manner disclosed herein, user management of bookmarks is greatly improved. In FIG. 4, a display affinity capability was shown beginning in block 190 and commencing to blocks 198 and 199. Such an implementation is shown in FIG. 14 wherein a browser display 400 consistent with the invention is depicted. In the menu bar of 402, bookmark option 404 has been designated at shown by the pop-up bookmark list 408 within a display area 406 of the main browser window 401. The pop-up bookmark list 408 is shown having typical editing commands at the bottom, such as an "add bookmark" command 416, and an "edit bookmark" command 418. Above these in pop-up bookmark list 408 is a list of existing bookmarks 410. The second bookmark in the list 410 is "MN Weather" 414. This bookmark has been designated as shown by the bold box 412.

The designation of bold box 412 by a user causes the browser 41 to scan bookmark records for stored affinities, in this case, shown by the first affinity list 422 presented in a first pop-up affinity list box 420. This first pop-up affinity list box 420 also has affinity commands 432, including the third bookmark in the affinity list, "Mankato" 426, is shown as having been designated by the user by bold box 424, which in turn causes the browser 41 to search for affinities stored for this bookmark, in turn causing second pop-up affinity list box 434 to be presented.

Supporting the graphical presentation of bookmarks and their affinities are records such as discussed in FIG. 3. Using the bookmarks used in illustrative graphical depiction in FIG. 14, bookmark records would exist for at least the following: My Chat Group, MN Weather, MN Tax Forms, Stock Quotes, White pages, Fred's clipart, Duluth, Minneapolis, Mankato, US Satellite, Pilot forecast, UM School of Meteorology, Polar Bear Club, and Weathermen, several of which having the characteristics shown in the following table:

| TITLE/ ADDRESS (URL)/ LIST OF KEYWORDS | LIST OF LINKS | LIST OF WORDS |
| --- | --- | --- |
| MN Weather http://www.current.wx.um-duluth.um.edu KMBX, color, radar, weather, Minnesota | Duluth, Minneapolis, State Forecast, UM School of Meteorology | radar, weather, minnesota, duluth, minneapolis, |
| Duluth http://dul.current.wx,um-duluth.um.edu color, radar, weather, Duluth, Minnesota | MN Weather | |
| Minneapolis http://wx.airport.minneapolis.mn.us | | Cold, front, weather, advisory, freezing, rain, minnesota |
| Mankato http://www.weather.radar.KMBX.com KMBX, color, radar | KMBX Home | |
| Weathermen http://whoswho.meteorology.org | KMBX Home, KVTL, WUIT, Channel 12 | Fred, Thomas, William, Edgar |

In this example, the user might have first saved the bookmark for MN Weather which is a jumping off point to various graphical and textual depictions of current Minnesota weather. The browser 41 captured the information about this hypertext document, including its storage location (URL), list of keywords, list of outbound links contained within the hypertext document, and non-trivial words.

Later, the user could bookmark "Duluth" which he found as an outbound link from the "MN Weather" hypertext document. "Duluth" is a current color radar image for the Duluth, Minn. area. The hypertext document has a return link but otherwise nothing else to characterize. The browser 41 could determine an affinity between "MN Weather" and "Duluth" due to the large overlap of "current.wx.um-duluth.um.edu" in their URL addresses.

Then, the user could bookmark "Minneapolis" which could be a pure text document of the forecast put out by the Minneapolis airport with the document having no HTML information such as keywords or outbound links. However, the browser 41 could find an affinity due to non-trivial words "weather", "Minnesota" being in both hypertext documents.

The user then could bookmark "Mankato" which is site sponsored by a television station providing a near real-time color radar image. The particular hypertext document could have one outbound link to the home page of the television station. The browser 41 could find an affinity to "MN Weather" by comparing its hidden metatag description finding the station identifier "KMBX" in both "MN Weather"0 bookmark record and in "Mankato".

The user could bookmark "Weathermen" which could be a listing of award-winning meteorologists, those having webpages being displayed as outbound links. The browser 41 could find the shared outbound link of "KMBX Home" in the bookmark record for "Mankato". This shared outbound link might be in the form of a URL visibly displayed or represented by a title or icon but still accessible within the hypertext document.

Note that "MN Weather" 414 has a two-way affinity with "Mankato" 426. This could be useful in searching both from general to specific and from specific to general.

This affinity could be made by the browser 41 during an update of the affinity list. Suppose, too, that the "Minneapolis" hypertext document is modified hourly and its text now has non-trivial words of "clear", "hot" and "sunny". Performing an update of the affinities might determine that there are now an insufficient amount of shared non-trivial words and the affinity could be deleted. Further suppose that the "Weathermen" hypertext document is no longer accessible. Updating could detect this and the affinity could be deleted.

The bold box designation 412 of "MN Weather" 414 of FIG. 14 could have a physical storage in FIG. 3 of "MN Weather" being the title field 112 of the MN Weather bookmark being the bookmark record 110. The affinity list record pointer 124 would be accessed to obtain a listing of affinity records for Duluth, Minn., Mankato, US Satellite, Pilot Forecast, UM School of Meteorology and Polar Bear Club. The first affinity pointer record 171 would have its affinity pointer field 172 pointing to the bookmark record for Duluth and its next affinity record pointer 173 pointing to a second affinity pointer record 174 having a second affinity pointer field pointing to the bookmark record for "Minneapolis" and its next affinity pointer record field 176 pointing to third affinity pointer record for "Mankato", and so forth.

When the third affinity pointer record is designated, then the browser 41 calls up the bookmark record for Mankato corresponding in FIG. 3 by having the Mankato bookmark now be the bookmark record 119 with its affinity list being accessed, pointing to "Weathermen" and "MN Weather".

Various modifications may be made to the illustrated embodiments without departing from the spirit and scope of the invention. Given the processing speed and increasing access speed of various Internet hypertext documents, it is possible that many of these routines could be performed dynamically by scanning all bookmarks and their associated hypertext documents performing such affinities rapidly after a bookmark is designated. It is further possible that suggested affinities accessed at sites preferred by the user or contained within browser 41 could also dynamically adjust the presented affinity list.

It may be desirable to add affinities based upon related sites suggested by an external Internet search engine, merging the ability to internally assess affinities and utilize externally found affinities.

Furthermore, it may also be desirable to automatically delete affinities when a user does not utilize these options over a period of time, thus demonstrating that the affinity is not of value to the user.

Furthermore, it may be desirable to present additional information about the affinity so that the user can judge whether this related site is of value to him rather than presenting merely a list, as shown in FIG. 14.

Other modifications may be made to the embodiments described herein without departing from the spirit and scope of the invention. Therefore, the invention lies in the claims hereinafter appended.

What is claimed is:

1. A computer-implemented method of associating a first bookmark for a storage location to a second bookmark, the method comprising:
    (a) determining an affinity between the first and second bookmarks based upon a predetermined affinity criteria; and
    (b) associating the first bookmark with the second bookmark by creating an affinity link responsive to the affinity exceeding a predetermined threshold.

2. The method of claim 1, wherein the predetermined affinity criteria includes a storage location address, wherein determining the affinity between the first and second bookmarks is further comprised of parsing an address segment from a first storage location address of the first bookmark, and searching for a match within a second storage location address of the second bookmark.

3. The method of claim 2, wherein the storage location address is in the form of a Uniform Resource Locator (URL).

4. The method of claim 1, wherein the predetermined affinity criteria includes an outbound link, wherein determining the affinity between the first and second bookmarks is further comprised of testing a first outbound link of the first bookmark, and searching for a match within a second list of links for the second bookmark.

5. The method of claim 1, wherein the predetermined affinity criteria includes a word count, wherein determining the affinity between the first and second bookmarks is further comprised of testing a first word of the first bookmark, and searching for a match within a second list of words for the second bookmark.

6. The method of claim 1, wherein the predetermined affinity criteria includes a keyword, wherein determining the affinity between the first and second bookmarks is further comprised of testing a first keyword of the first bookmark, and searching for a match within a second list of keywords for the second bookmark.

7. The method of claim 1, further comprising adding a first bookmark record for the first bookmark, including:
    (a) allocating storage for the first bookmark record;
    (b) determining at least one characteristic of a first hypertext document associated with the first bookmark; and
    (c) storing the characteristic in the first bookmark record.

8. The method of claim 7, wherein determining the characteristic of the first hypertext document includes determining at least one of a storage location address, a list of outbound links, a list of words, and list of keywords for the first hypertext document.

9. The method of claim 1, wherein the predetermined affinity criteria includes at least two characteristics selected from a group consisting of a storage location, an outbound link, a word count, and a keyword, wherein determining the affinity between the first and second bookmarks further comprises combining affinity results for each characteristic and associating the first and second bookmark when the combined affinity result exceeds a predetermined threshold;
    wherein results for the storage location characteristic comprises parsing an address segment from a first storage location address of the first bookmark for storage location, and searching for a match within a second storage location address of the second bookmark;
    wherein results for the outbound link characteristic comprises testing a first outbound link of the first bookmark, and searching for a match within a second list of links for the second bookmark;
    wherein results for the word count characteristic comprises testing a first word of the first bookmark, and searching for a match within a second list of words for the second bookmark; and
    wherein results for the keyword characteristic comprises testing a first keyword of the first bookmark, and searching for a match within a second list of keywords for the second bookmark.

10. The method of claim 1, further comprising:
for each bookmark, creating an affinity link list; and
associating the first bookmark with the second bookmark by adding an affinity link pointer to the affinity link list for the first bookmark that points to the second bookmark.

11. A computer-implemented method of associating a first bookmark for a storage location to a second bookmark, the method comprising:
    (a) determining an affinity between first and second bookmarks;
    (b) associating the first bookmark with the second bookmark; and
    (c) in response to a user selecting the first bookmark, displaying the second bookmark.

12. The method of claim 11, further comprising:
removing the display of the second bookmark in response to the user removing selection of the first bookmark.

13. The method of claim 11, wherein selecting the first bookmark further comprises pointing to a first bookmark in a predetermined one of a bookmark list and a hypertext document, and displaying the second bookmark comprises popping up a list containing the second bookmark.

14. An apparatus comprising:
    (a) a memory; and
    (b) a program, resident in the memory, the program is configured to determine an affinity between first and the second bookmarks based upon a predetermined affinity criteria; and to associate the first bookmark with the second bookmark by creating an affinity link responsive to the affinity exceeding a predetermined threshold.

15. The apparatus of claim 14, wherein the program is further configured to display the first bookmark and, in response to a user input directed to the first bookmark, to access a first bookmark record data structure to obtain the associated second bookmark, and to then display the second bookmark.

16. The apparatus of claim 15, wherein the program is configured to navigate to a first hypertext document when the first bookmark is selected, and to navigate to a second hypertext document when the second bookmark is selected.

17. The apparatus of claim 14, wherein the predetermined affinity criteria includes a storage location address.

18. The apparatus of claim 14, wherein the predetermined affinity criteria includes an outbound link.

19. The apparatus of claim 14, wherein the predetermined affinity criteria includes a word count.

20. The apparatus of claim 14, wherein the predetermined affinity criteria includes a keyword.

21. The apparatus of claims 14, wherein each hypertext document is formatted in Hypertext Markup Language (HTML).

22. The apparatus of claim 14, wherein the first bookmark is one of a plurality of first bookmarks, and wherein the second bookmark is a plurality of associated second bookmarks, wherein the program is further configured to display a portion of the plurality of first bookmarks and a portion of the plurality of associated second bookmarks.

23. A program product, comprising:
   (a) a program configured to determine an affinity between first and second bookmarks based upon a predetermined affinity criteria; and to associate by creating an affinity link the first bookmark with the second bookmark responsive to the affinity exceeding a predetermined threshold; and
   (b) a signal bearing media bearing the program.

24. The program product of claim 23, wherein the signal bearing media is transmission type media.

25. The program product of claim 23, wherein the signal bearing media is recordable media.

* * * * *